United States Patent
Fujishima et al.

(10) Patent No.: US 8,629,641 B2
(45) Date of Patent: Jan. 14, 2014

(54) MACHINE TOOL TO CONTROL DRIVING OF CONTROL OBJECTS

(75) Inventors: Makoto Fujishima, Yamatokoriyama (JP); Hiroki Nakahira, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 443 days.

(21) Appl. No.: 12/950,181

(22) Filed: Nov. 19, 2010

(65) Prior Publication Data

US 2011/0169440 A1 Jul. 14, 2011

(30) Foreign Application Priority Data

Jan. 13, 2010 (JP) ................................. 2010-005030

(51) Int. Cl.
*G05B 13/00* (2006.01)
(52) U.S. Cl.
USPC ...... 318/561; 318/568.24; 318/569; 318/600; 318/632
(58) Field of Classification Search
USPC ..................... 318/561, 568.24, 569, 600, 632
See application file for complete search history.

(56) References Cited

FOREIGN PATENT DOCUMENTS

| JP | 8-76827 | 3/1996 |
|---|---|---|
| JP | 2000-317772 | 11/2000 |
| JP | 2001-259965 | 9/2001 |

*Primary Examiner* — Erick Glass
(74) *Attorney, Agent, or Firm* — Oblon, Spivak, McClelland, Maier & Neustadt, L.L.P.

(57) ABSTRACT

A machine tool includes a time calculation unit calculating the time for a spindle to arrive at a target rotational speed, and the time for a spindle head to arrive at a target position; a comparison unit comparing the time to arrive at the target rotational speed and the time to arrive at the target position; and a drive control unit controlling the drive of the spindle and the drive of the spindle head. The drive control unit controls the drive of the spindle head, when a determination is made that the time to arrive at the target rotational speed is longer than the time to arrive at the target position, such that the time for the spindle head to arrive at the target position is longer than the calculated time to arrive at the target position, and less than or equal to the calculated time to arrive at the target rotational speed. Accordingly, the machine tool can drive the spindle head that is a control object in a power-saving mode.

3 Claims, 12 Drawing Sheets

FIG.4

| NC PROGRAM No. 123 ||
|---|---|
| BLOCK NO. | COMMAND |
| 0001 | G00 G80 X100 Y200 S10000 |
| 0002 | G170 Z60 |
| 0003 | G01 Z75 F1000 |
| 0004 | G00 Z60 |
| 0005 | ... |
| 0006 | ... |
| 0007 | ... |
| 0008 | ... |
| 0009 | ... |
| 0010 | ... |

MACHINE TOOL TO CONTROL DRIVING OF CONTROL OBJECTS

BACKGROUND OF THE INVENTION

1. Field of the Invention

The present invention relates to machine tools, particularly a machine tool driven according to a numerical control (NC) program.

2. Description of the Background Art

A machine tool that rotatably drives an object of control such as a spindle, and that moves linearly an object of control such as a feed rod, according to an NC program, is known.

Japanese Patent Laying-Open No. 2000-317772 discloses a control method of such machine tools directed to reducing the cycle time. This method controls the machine tool such that machining of a workpiece is started after confirming that the spindle has reached a rotational speed designated by a data block in an NC program. This control method includes a first positioning step, a second positioning step, and a machining step.

In the first positioning step, the spindle having a tool attached is rotatably actuated and the feed rod is driven, allowing the tool to be positioned towards an index position for alignment of the machining site of a workpiece and the cutting direction. In the second positioning step, following confirmation of completion of the feed rod travel in the first positioning step, the tool is positioned in the cutting direction towards the machining start position without confirming arrival of the spindle at the designated rotational speed. In the machining step, following confirmation of completion of the second positioning step, arrival of the spindle at the designated rotational speed is confirmed. Then, the tool is delivered for machining in the cutting direction after confirming the arrival at the required speed.

SUMMARY OF THE INVENTION

According to the control method of Japanese Patent Laying-Open No. 2000-317772, transportation of the spindle is executed before the rotational speed of the spindle arrives at a target rotational speed, and the operation is continued for machining if confirmation of the rotational speed of the spindle arriving at the target rotational speed is obtained during transportation of the spindle.

In such a control method, rotation of the spindle and transportation of the spindle by the feed rod are carried out independently without mutual association. Specifically, rotation of the spindle and transportation of the spindle by the feed rod are carried out at the maximum acceleration and/or maximum deceleration respectively. In other words, rotation of the spindle and transportation of the spindle are executed over the shortest time by the maximum power.

Since rotation and transportation of the spindle are carried out independently without mutual association, the time for the rotation of the spindle to arrive at the target rotational speed differs in most cases from the time for the feed rod to arrive at the target position. This means that the control object first arriving at a target state (target rotational speed or target position) must wait until the other control object arrives at its target state.

Thus, in the conventional control method, each of the control objects is set to arrive at the target state in the shortest time by the largest power, and the control object that has first arrived at the target state must wait until the other control object arrives at the target state. Therefore, power is consumed needlessly in the conventional control method.

A machine tool according to an aspect of the present invention includes a first control object and a second control object, and is directed to driving the first control object and second control object. The machine tool includes a storage device storing first information including the maximum acceleration and deceleration and/or maximum speed when the first control object is driven, and second information including the maximum acceleration and deceleration and/or maximum speed when the second control object is driven; a calculation unit configured to calculate a time for the first control object to arrive at a predetermined first state, and a time for the second control object to arrive at a predetermined second state based on the first information and second information; a comparison unit configured to compare the time to arrive at the first state and the time to arrive at the second state; and a drive control unit configured to control a drive of the first control object and a drive of the second control object. The drive control unit controls the drive of the second control object such that, when a determination is made that the time to arrive at the first state is longer than the time to arrive at the second state, the time for the second control object to arrive at the second state is longer than the calculated time to arrive at the second state, and less than or equal to the calculated time to arrive at the first state.

Preferably, the first control object moves either in rotation or in linear travel as the drive. The second control object moves either in rotation or in linear travel as the drive. When a determination is made that the time to arrive at the first state is longer than the time to arrive at the second state, the drive control unit controls the drive of the second control object such that the time for the second control object to arrive at the second state is equal to the calculated time to arrive at the first state.

Preferably, the first control object moves in rotation as the drive. The second control object moves in linear travel as the drive. The storage device further stores rotational speed information associated with rotation of the first control object, and travel position information associated with the linear travel of the second control object. The calculation unit calculates the time for the first control object to arrive at the first state and the time for the second control object to arrive at the second state, based on the rotational speed information and travel position information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 represents an example of an NC program.

DESCRIPTION OF THE PREFERRED EMBODIMENTS

Figure 1:
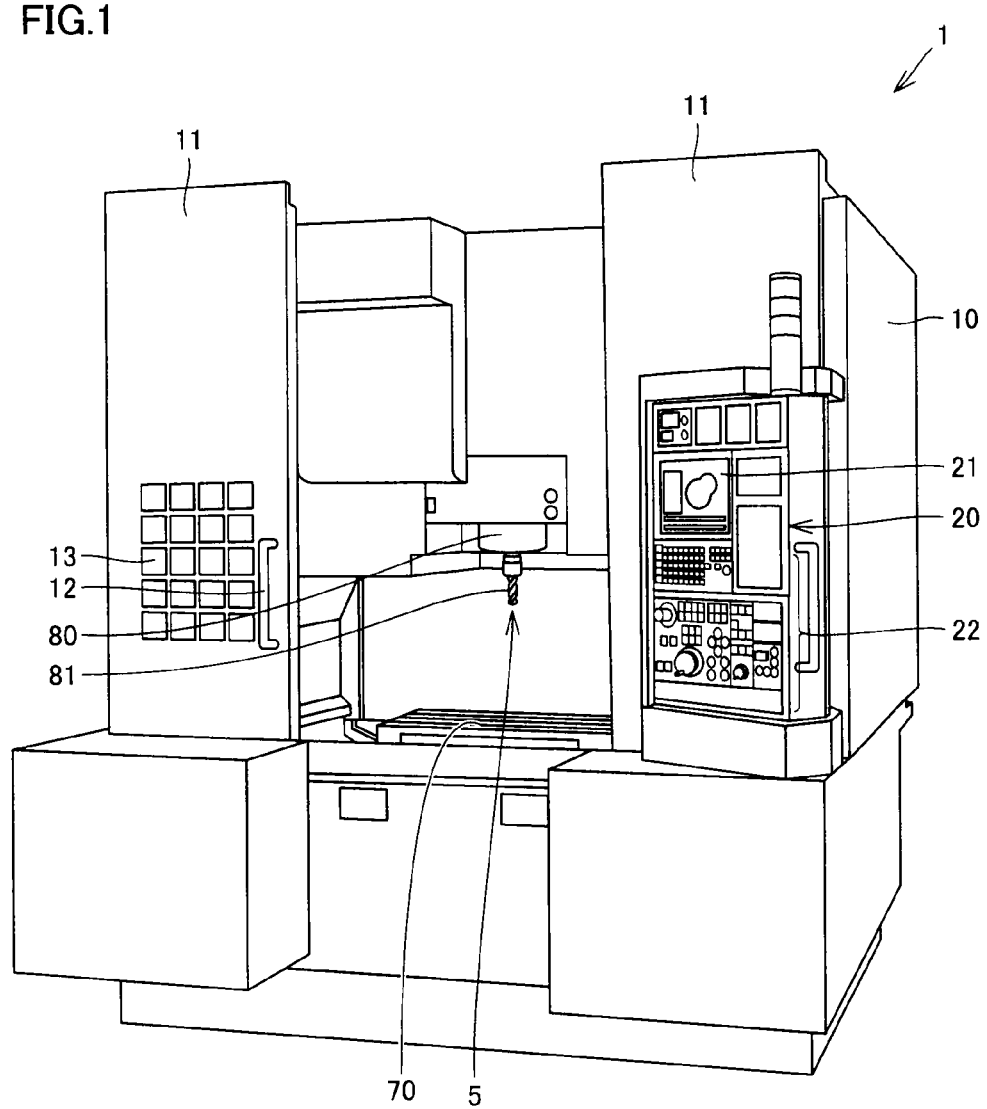
FIG. 1 is a perspective view of a machine tool.

A machine tool according to an embodiment of the present invention will be described hereinafter with reference to the drawings. In the following, the same components have the same reference characters allotted. Their designation and function are also the same. Therefore, detailed description thereof will not be repeated.

<Outline of Machine Tool>

Referring to the perspective view of FIG. 1, a machine tool 1 according to the present embodiment includes a main unit 5, a splashguard 10, and an operation panel 20. The following description is based on the case where machine tool 1 is a vertical machining center.

Main unit 5 is a machine to work on a workpiece. Main unit 5 includes a table 70, a spindle 80, and a tool 81. The configuration of main unit 5 will be described in detail afterwards (FIG. 2).

Splashguard 10 includes an open/close type door 11. Door 11 includes a handle 12 and a window 13. Splashguard 10 is provided surrounding main unit 5. Splashguard 10 serves to protect the user, prevent the scattering of chips and coolant, and collection thereof in conjunction with the machining process and the like of a work at main unit 5. The user can slide door 11 by holding handle 12. The user can visually confirm the processing of a work by main unit 5 through window 13.

Operation panel 20 includes a monitor 21 and an operation unit 22. Operation panel 20 accepts various operations from the user via operation unit 22. Operation panel 20 controls the operation of main unit 5 according to an operation by the user. Monitor 21 provides the display of various information such as the machining status of a work, an NC program, and the like. Operation unit 22 includes a hardware key and various switches.

Figure 2:
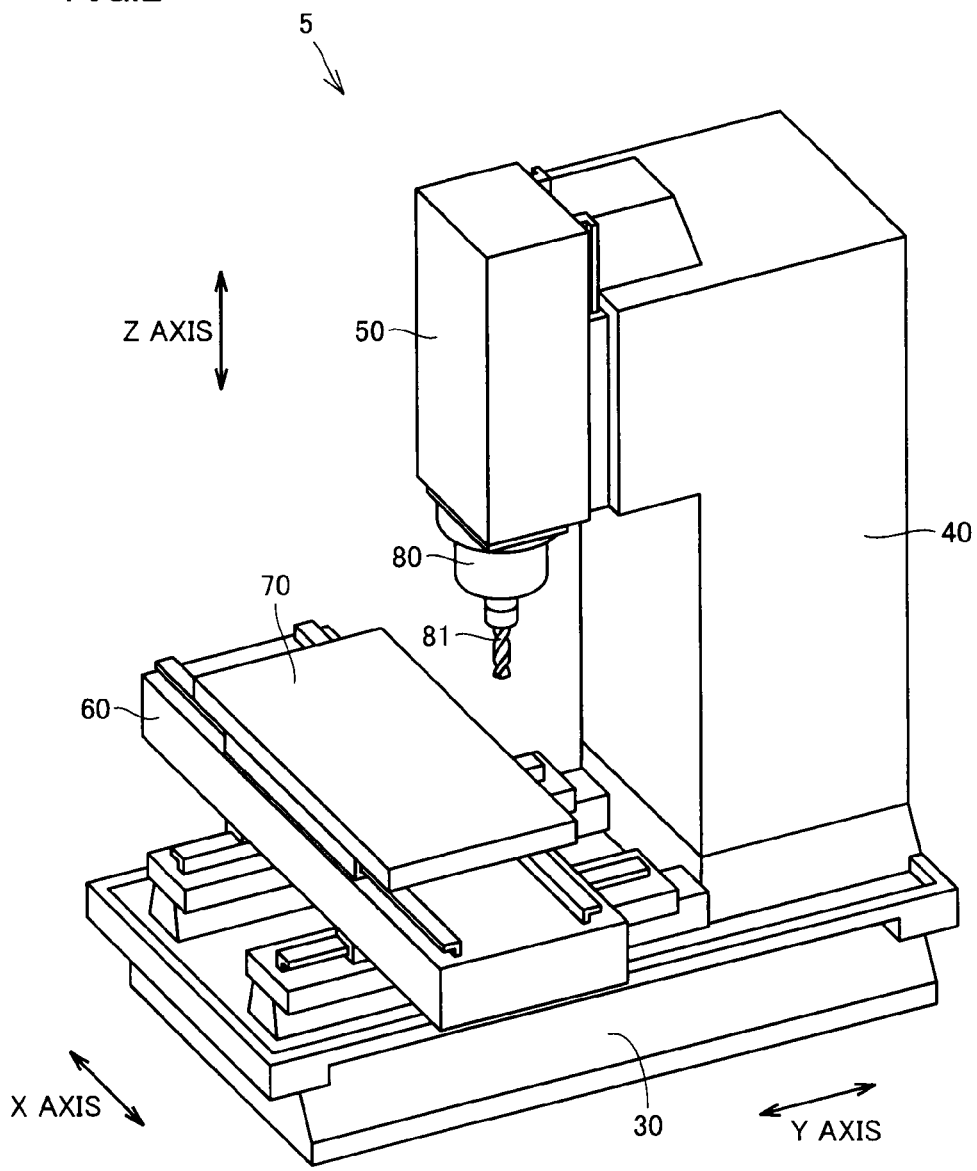
FIG. 2 is a perspective view of a main unit.

Referring to the perspective view of FIG. 2, main unit 5 includes a bed 30, column 40, a spindle head 50, a saddle 60, a table 70, a spindle 80 and a tool 81. Bed 30 is a platform supporting column 40 and saddle 60. Column 40 is a platform supporting spindle head 50. Column 40 is fixed to bed 30. Spindle head 50 supports spindle 80 by a bearing, and transmits the rotation of spindle motor 304 (refer to FIG. 3) to spindle 80. Spindle head 50 is supported at the front side (saddle 60 side) of column 40, allowing elevation in the Z axis direction.

Saddle 60 is a platform supporting table 70. Saddle 60 can travel in the Y axis direction on bed 30. Table 70 is a platform to which a work is attached. Table 70 can travel in the X axis direction on saddle 60.

Spindle 80 rotates about a rotation axis parallel to the Z axis, and has tool 81 attached in the direction of table 70. Tool 81 rotates in association with the rotation of spindle 80. According to the rotation of tool 81, a work (not shown) on table 70 is machined. Spindle 80 travels in the Z axis direction in accordance with the up/down movement of spindle head 50.

<Hardware Configuration>

Figure 3:
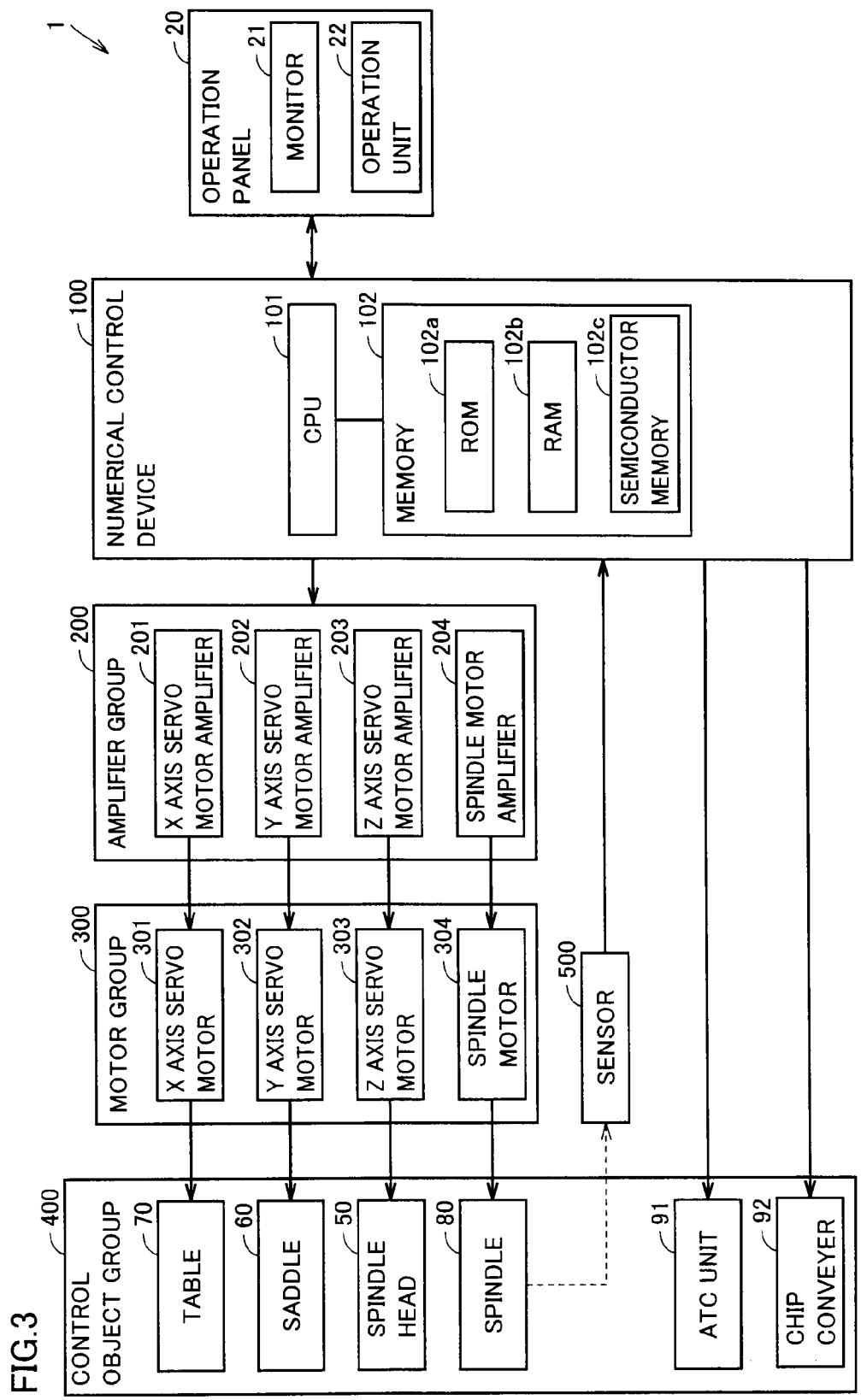
FIG. 3 represents a hardware configuration of a machine tool.

Referring to the hardware configuration of FIG. 3, tool machine 1 includes an operation panel 20, a numerical control device 100, an amplifier group 200, a motor group 300, a control object group 400, and a sensor 500.

Operation panel 20 includes monitor 21 and operation unit 22, as mentioned above.

Amplifier group 200 includes an X axis servo motor amplifier 201, a Y axis servo motor amplifier 202, a Z axis servo motor amplifier 203, and a spindle motor amplifier 204. Each of amplifiers 201 to 204 amplifies a control signal from numerical control device 100 to send the amplified signal to each motor in motor group 300.

Motor group 300 includes an X axis servo motor 301, a Y axis servo motor 302, a Z axis servo motor 303, and a spindle motor 304. Each of motors 301 to 304 is rotated based on a signal sent from a corresponding one of amplifiers 201 to 204.

Control object group 400 includes the control objects at machine tool 1 such as spindle head 50, saddle 60, table 70, spindle 80, automatic tool changer (ATC) unit 91, and a chip conveyer 92. The control object is not limited to those illustrated.

Table 70 is connected to X axis servo motor 301 to move in a corresponding direction in the X axis direction of FIG. 2 in association with the rotation of X axis servo motor 301. Saddle 60 is connected to Y axis servo motor 302 to travel in a corresponding direction according to the rotation in the Y axis direction of FIG. 2 in association with the rotation of Y axis servo motor 302.

Spindle head 50 is connected to Z axis servo motor 303, and responds to the rotation of Z axis servo motor 303 to travel in a direction corresponding to the relevant rotation in the Z axis direction of FIG. 2. Spindle 80 is connected to spindle motor 304, and responds to the rotation of spindle motor 304 to rotate in a direction according to the rotation.

ATC unit 91 is a unit for automatic exchange of tools. Chip conveyer 92 is a device for transporting cutting chips generated by machining a work. ATC unit 91 and chip conveyer 92 are driven based on a control signal from numerical control device 100.

Sensor 500 senses the revolutions of spindle 80 to send the sensed result to numerical control device 100. Numerical control device 100 calculates the rotational speed of spindle 80 from the revolution count.

Numerical control device 100 includes a central processing unit (CPU) 101, and a memory 102. Memory 102 includes a read only memory (ROM) 102a, a random access memory (RAM) 102b, and a non-volatile semiconductor memory 102c such as a flash memory.

CPU 101 executes a program stored in memory 102. ROM 102a is a non-volatile storage medium. RAM 102b temporarily stores various programs, data generated by execution of a program by CPU 101, and data entered via operation panel 20. Semiconductor memory 102c stores the NC program package, and the NC program related to machining of a work (refer to FIG. 4). The NC program is constituted of a plurality of block arrays, and includes a code determining the machine operation mode, and a code designating an auxiliary function other than the operation. CPU 101 interprets the relevant NC program for every block. Each control object included in control object group 400 is controlled based on a program command generated by interpretation through CPU 101.

The software of a program and the like saved in memory 102 is provided in a memory card or another storage medium, available as a program product. Alternatively, the software may be presented as a program product that can be downloaded by an information provider connected on the Internet.

Such software is read out from the storage medium by a memory card reader writer or other readers, or downloaded via the Interface to be temporarily stored in semiconductor memory RAM 102*b*. The software is read out from RAM 102*b* by CPU 101, and then stored in a program format that can be executed in semiconductor memory 102*c*. CPU 101 executes that program.

The illustrated elements constituting machine tool 1 are typical elements. Therefore, it can be said that the essential part of the present invention lies in the software stored in memory 102, a memory card, or another storage medium, or that can be downloaded via a network.

The storage medium is not limited to a DVD-ROM, CD-ROM, FD (Flexible Disk), and hard disk, and may be any medium that carries a program fixedly such as a magnetic tape, cassette tape, optical disk (MO (Magnetic Optical Disc)/MD (Mini Disc) DVD (Digital Versatile Disc)), optical card, mask ROM, EPROM (Electronically Programmable Read-Only Memory), EEPROM (Electronically Erasable Programmable Read-Only Memory), a semiconductor memory such as a flash ROM, and the like. The recording medium allows a computer to read out the relevant program and the like, and is a non-transitory medium.

As used herein, a program refers to, in addition to a program that can be executed directly by a CPU, a program in a source program format, a compressed program, an encrypted program, and the like.

<NC Program>

FIG. 4 represents an example of an NC program. As shown in FIG. 4, the NC program has commands described associated with block numbers. A command corresponding to one block number is relevant to the aforementioned one block. FIG. 4 shows ten commands from block number 0001 to 0010 as a portion of NC Program No. 123.

NC Program No. 123 specifically describes the command contents set forth below. In block number 0001, table 70 and saddle 60 are driven (linear travel), and (X, Y, Z)=(100, 200, 0) is set as the index position. Further, in block number 0001, spindle 80 is rotated until its rotational speed arrives at 10000 min-1 while table 70 and saddle 60 are driven. In block number 0002, spindle head 50 is moved, and (X, Y, Z)=(100, 200, 60) is set as the process start position.

In block number 0003, a workpiece is subjected to drill processing by the cutting with a drill (tool 81) at the speed of 1000 mm/min up to the position of (X, Y, Z)=(100, 200, 75). In other words, in block number 0003, spindle head 50 is moved. In block number 0004, tool 81 is fast-retreated to the position of (X, Y, Z)=(100, 200, 60). In other words, in block number 0004, spindle head 50 is fast-retreated.

The p-th command, the q-th command, and the r-th command from the top in the NC program stored in memory 102 such as NC Program No. 123 are represented as "command Cp", "command Cq", and "command Cr", respectively. As used herein, p, q and r are an arbitrary natural number of 1 and above. For example, the command in block number 0001 is expressed as command C1.

<Overview of Operation>

An overview of the control carried out at machine tool 1 will be described hereinafter based on three specific examples. First, control between a control object that moves linearly (spindle head 50, by way of example) and a control object that rotates (spindle 80) will be described. Then, control between linearly-movable control objects (spindle head 50 and table 70, by way of example) will be described. Lastly, control between two linearly-movable control objects (spindle head 50 and table 70, by way of example), and a rotatable control object (spindle 80) will be described.

[Control Between Linearly-Movable Control Object and Rotatable Control Object]

Figure 5:
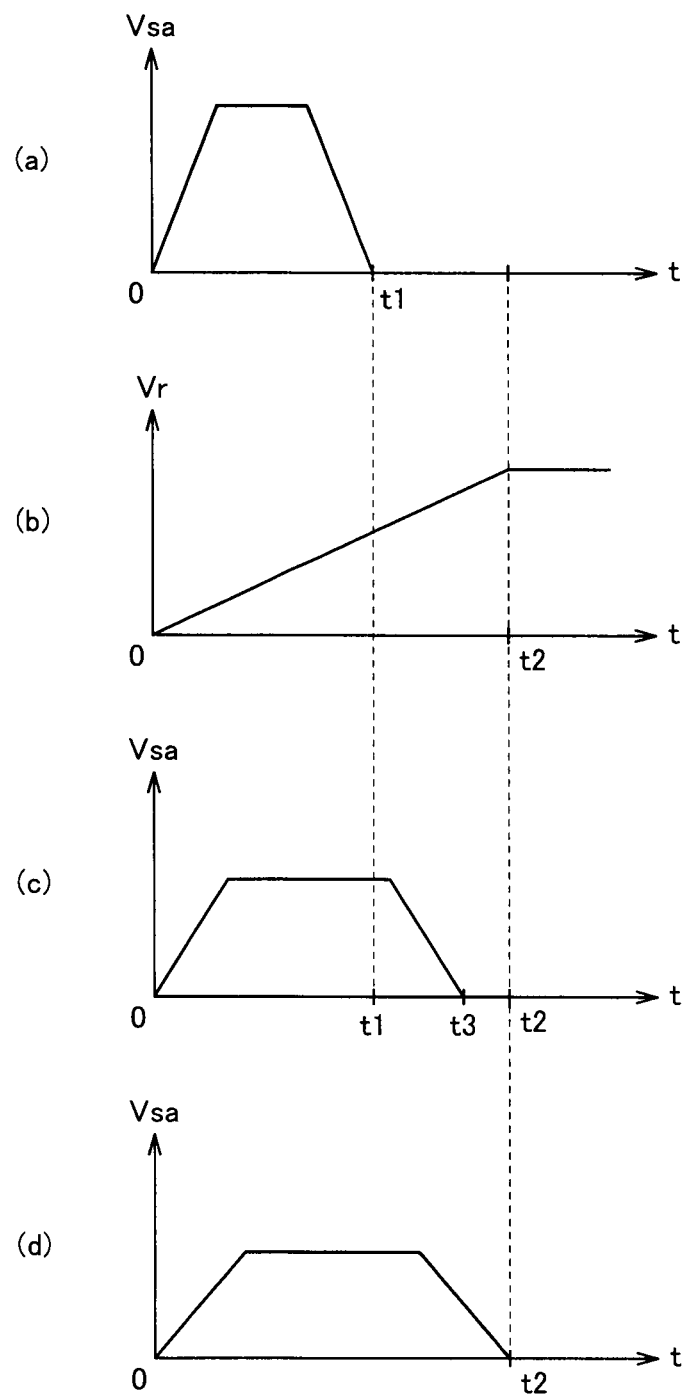
FIG. 5 is a diagram to describe an example of control executed at the machine tool.

FIG. 5 is a diagram to describe an example of control executed at machine tool 1. Specifically, FIG. 5 is a diagram to describe control executed by machine tool 1 during execution of one command directed to driving spindle head 50 and spindle 80.

FIG. 5(*a*) is a diagram for comparison, representing the relationship between a time t and a speed Vsa of spindle head 50 during the travel of spindle head 50 to a target position defined by a command Cp. Specifically, FIG. 5(*a*) shows spindle head 50 gaining speed under maximum acceleration to arrive at the maximum travel speed, and then in a stopped state under maximum deceleration. In other words, FIG. 5(*a*) represents the relationship between time t and speed Vsa of spindle head 50 in the case where spindle head 50 arrives at the target position over the shortest time.

FIG. 5(*b*) represents the relationship between time t before spindle 80 arrives at a target rotational speed defined by command Cp and a rotational speed Vr of spindle 80. More specifically, FIG. 5(*b*) shows spindle 80 gaining speed under maximum acceleration to arrive at the target rotational speed, and then continuing rotation at the target rotational speed.

Referring to FIG. 5(*a*), spindle head 50 arrives at the target position defined by command Cp at a time t1 seconds after the start of the drive. Referring to FIG. 5(*b*), spindle 80 arrives at the target revolution count defined by command Cp at a time t2 seconds after the start of the drive (t2>t1). Therefore, spindle head 50 takes a standby state at the target position for t2−t1 seconds.

Spindle head 50 arrives at the target position over the shortest time by the maximum acceleration and maximum deceleration, as mentioned previously. Spindle head 50 will have to stand by until spindle 80 arrives at the target revolution count. Therefore, power will be consumed needlessly in association with the drive of spindle head 50 when such control is conducted by machine tool 1.

As such, machine tool 1 conducts the control shown in FIG. 5(*c*). More preferably, machine tool 1 conducts the control shown in FIG. 5(*d*). Each control shown in FIGS. 5(*c*) and (*d*) will be described hereinafter.

FIG. 5(*c*) represents the relationship between time t and speed Vsa of spindle head 50 during the travel of spindle head 50 to the target position defined by command Cp. Specifically, FIG. 5(*c*) represents the relationship between time t and speed Vsa of spindle head 50 in the case where spindle head 50 arrives at the target position at a time t3 seconds after the start of the drive of spindle head 50 (t1<t3<t2).

Referring to FIG. 5(*c*), machine tool 1 sets the time for gaining speed at maximum acceleration and the time for slowing down at maximum deceleration shorter than each time shown in FIG. 5(*a*), for example, whereby the time for spindle head 50 to arrive at the target position can be deferred later than the arriving time t1 shown in FIG. 5(*a*). Alternatively, machine tool 1 causes spindle head 50 to gain speed at an acceleration lower than the maximum acceleration and to slow down at a deceleration lower than the maximum deceleration (in the case where the deceleration is represented by a negative value, the deceleration with the low absolute value), the arriving time of spindle head 50 at the target position can be deferred later than arriving time t1 shown in FIG. 5(*a*).

By machine tool 1 conducting control as shown in FIG. 5(*c*) with respect to spindle head 50, spindle head 50 will no longer arrive at the target position in the shortest time by the maximum acceleration and maximum deceleration. Therefore, power consumption can be reduced than that of FIG. 5(*a*).

FIG. 5(d) represent represents the relationship between time t and speed Vsa of spindle head 50 during the travel of spindle head 50 to the target position defined by command Cp. Specifically, FIG. 5(c) represents the relationship between time t and speed Vsa of spindle head 50 in the case where spindle head 50 arrives at the target position at a time t2 seconds after the start of the drive of spindle head 50. In other words, FIG. 5(d) represents the case where the arriving time of spindle head 50 at the target position is delayed than the case shown in FIG. 5(c), and the arriving time of spindle head 50 at the target position is set equal to time t2 where spindle 80 arrives at the target rotational speed.

By machine tool 1 conducting control as shown in FIG. 5(d) with respect to spindle head 50, spindle head 50 will no longer arrive at the target position in the shortest time by the maximum acceleration and maximum deceleration. Therefore, power consumption can be reduced than that of FIG. 5(a). Further, under the control shown in FIG. 5(d), machine tool 1 sets the time for acceleration and deceleration shorter, or the value of acceleration and deceleration lower, as compared with the control of FIG. 5(c). Therefore, under the control shown in FIG. 5(d), machine tool 1 can further reduce power consumption as compared to the control shown in FIG. 5(c).

[Control Between Linearly-Movable Control Objects]

Figure 6:
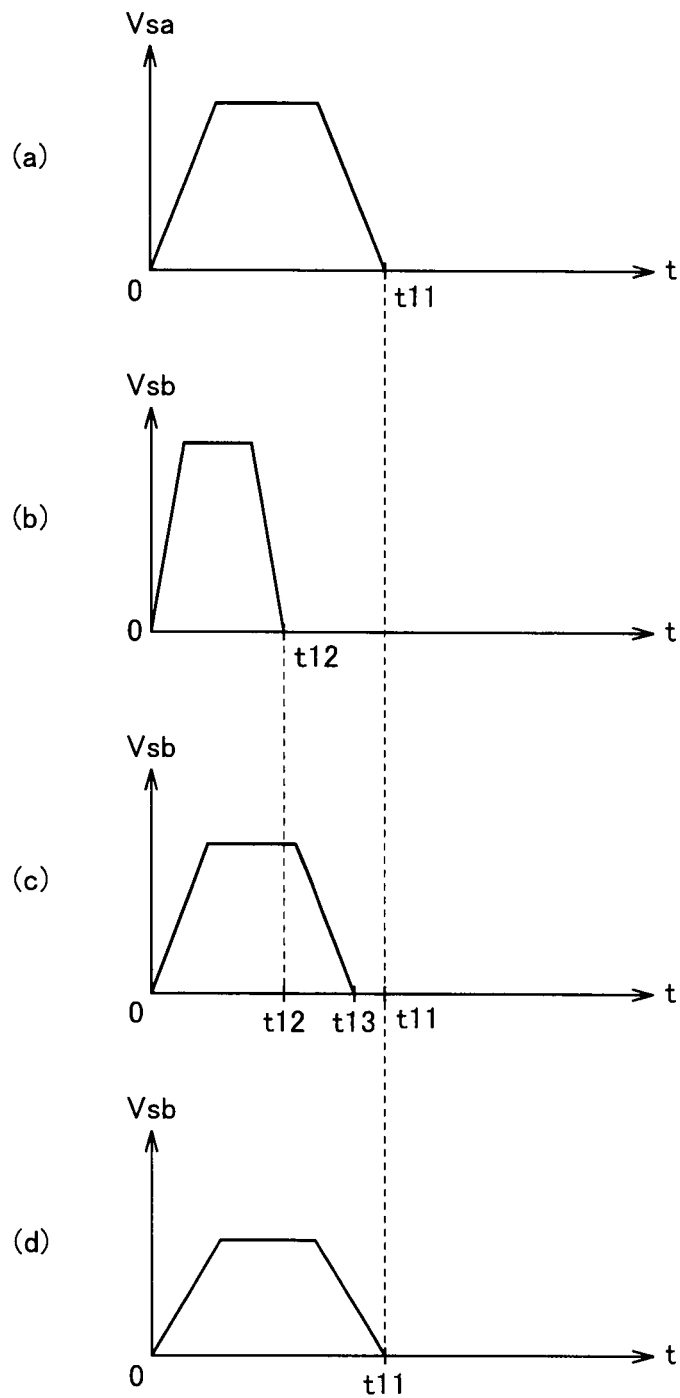
FIG. 6 is a diagram to describe another example of control executed at the machine tool.

FIG. 6 is a diagram to describe another example of control executed at machine tool 1. Specifically, FIG. 6 is a diagram to describe control executed by machine tool 1 during execution of one command directed to driving spindle head 50 and table 70.

FIG. 6(a) is a diagram for comparison, representing the relationship between time t and a speed Vsa of spindle head 50 during the travel of spindle head 50 to a target position defined by a command Cq. Specifically, FIG. 6(a) shows spindle head 50 gaining speed under maximum acceleration to arrive at the maximum travel speed, and then in a stopped state under maximum deceleration. In other words, FIG. 6(a) represents the relationship between time t and speed Vsa of spindle head 50 in the case where spindle head 50 arrives at the target position over the shortest time.

FIG. 6(b) represents the relationship between time t and a speed Vsb of table 70 in the case where table 70 travels to the target position defined by command Cq. More specifically, FIG. 6(b) shows table 70 gaining speed under maximum acceleration to arrive at the maximum travel speed, and then in a stopped state under maximum deceleration. In other words, FIG. 6(b) represents the relationship between time t and speed Vsb of table 70 in the case where table 70 arrives at the target position over the shortest time.

Referring to FIG. 6(a), spindle head 50 arrives at the target position defined by command Cq at a time t11 seconds after the start of the drive. Referring to FIG. 6(b), table 70 arrives at the target position defined by command Cq at a time t12 seconds after the start of the drive (t12<t11). Therefore, table 70 takes a standby state at the target position for t11–t12 seconds.

Table 70 arrives at the target position over the shortest time by the maximum acceleration and maximum deceleration, as mentioned previously. Table 70 will have to stand by until spindle head 50 arrives at the target position. Therefore, power will be consumed needlessly in association with the drive of table 70 when such control is conducted by machine tool 1.

As such, machine tool 1 conducts the control shown in FIG. 6(c). More preferably, machine tool 1 conducts the control shown in FIG. 6(d). Each control shown in FIGS. 6(c) and (d) will be described hereinafter.

FIG. 6(c) represents the relationship between time t and speed Vsb of table 70 during the travel of table 70 to the target position defined by command Cq. Specifically, FIG. 6(c) represents the relationship between time t and speed Vsb of table 70 in the case where table 70 arrives at the target position at a time t13 seconds after the start of the drive of table 70 (t12<t13<t11).

Referring to FIG. 6(c), machine tool 1 sets the time for gaining speed at maximum acceleration and the time for slowing down at maximum deceleration shorter than each time shown in FIG. 6(b), for example, whereby the time for table 70 to arrive at the target position can be deferred later than the arriving time t12 shown in FIG. 6(b). Alternatively, machine tool 1 causes table 70 to gain speed at an acceleration lower than the maximum acceleration and to slow down at a deceleration lower than the maximum deceleration (in the case where the deceleration is represented by a negative value, the deceleration with the low absolute value), the arriving time of table 70 at the target position can be deferred later than arriving time t12 shown in FIG. 6(b).

By machine tool 1 conducting control as shown in FIG. 6(c) with respect to table 70, table 70 will no longer arrive at the target position in the shortest time by the maximum acceleration and maximum deceleration. Therefore, power consumption can be reduced than that of FIG. 6(b).

FIG. 6(d) represents the relationship between time t and speed Vsb of table 70 during the travel of table 70 to the target position defined by command Cq. Specifically, FIG. 6(d) represents the relationship between time t and speed Vsb of table 70 in the case where table 70 arrives at the target position at a time t11 seconds after the start of the drive of table 70. In other words, FIG. 6(d) represents the case where the arriving time of table 70 at the target position is delayed than the case shown in FIG. 6(c), and the arriving time of table 70 at the target position is set equal to time t11 where spindle head 50 arrives at the target rotational speed.

By machine tool I conducting control as shown in FIG. 6(d) with respect to table 70, table 70 will no longer arrive at the target position in the shortest time by the maximum acceleration and maximum deceleration. Therefore, power consumption can be reduced than that of FIG. 6(b). Further, under the control shown in FIG. 6(d), machine tool 1 sets the time for acceleration and deceleration shorter, or the value of acceleration and deceleration lower, as compared with the control of FIG. 6(c). Therefore, under the control shown in FIG. 6(d), machine tool I can further reduce power consumption as compared to the control shown in FIG. 6(c).

[Control Between Two Linearly-Movable Control Objects and Rotatable Control Object]

Figure 7:
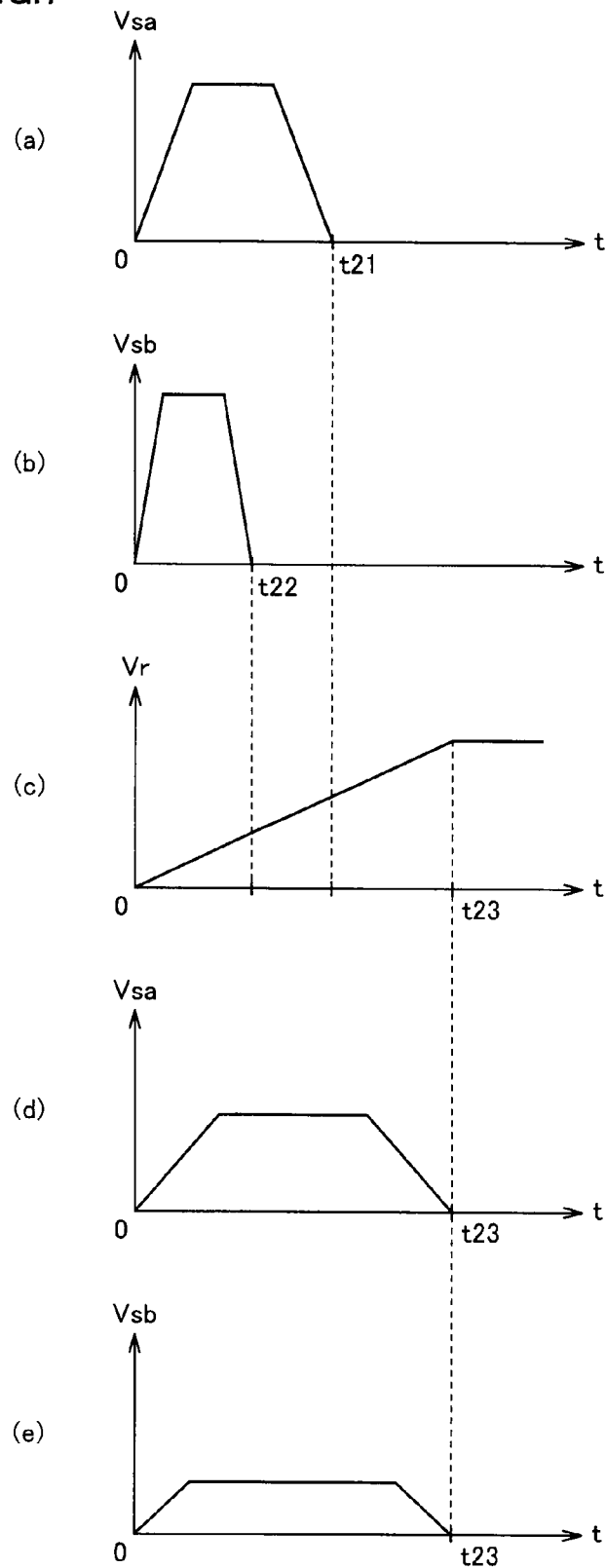
FIG. 7 is a diagram to describe a further example of control executed at the machine tool.

FIG. 7 is a diagram to describe a further example of control executed by machine tool 1. Specifically, FIG. 7 is a diagram to describe control executed by machine tool 1 during execution of one command directed to driving spindle head 50, table 70, and spindle 80.

FIG. 7(a) is a diagram for comparison, representing the relationship between time t and speed Vsa of spindle head 50 during the travel of spindle head 50 to a target position defined by a command Cr. Specifically, FIG. 7(a) shows spindle head 50 gaining speed under maximum acceleration to arrive at the maximum travel speed, and then in a stopped state under maximum deceleration. In other words, FIG. 7(a) represents the relationship between time t and speed Vsa of spindle head 50 in the case where spindle head 50 arrives at the target position over the shortest time.

FIG. 7(b) is a diagram for comparison, representing the relationship between time t and speed Vsb of table 70 in the case where table 70 travels to the target position defined by command Cr. More specifically, FIG. 7(b) shows table 70 gaining speed under maximum acceleration to arrive at the maximum travel speed, and then in a stopped state under maximum deceleration. In other words, FIG. 7(b) represents the relationship between time t and speed Vsb of table 70 in the case where table 70 arrives at the target position over the shortest time.

FIG. 7(c) represents the relationship between time t before spindle 80 arrives at a target rotational speed defined by command Cr and rotational speed Vr of spindle 80. More specifically, FIG. 7(c) shows spindle 80 gaining speed under maximum acceleration to arrive at the target rotational speed, and then continuing rotation at the target rotational speed.

Referring to FIG. 7(a), spindle head 50 arrives at the target position defined by command Cr at a time t21 seconds after the start of the drive. Referring to FIG. 7(b), table 70 arrives at the target position defined by command Cr at a time t22 seconds after the start of the drive (t22<t21). Referring to FIG. 7(c), spindle 80 arrives at the target rotational speed defined by command Cr at a time t23 seconds after the start of the drive (t23>t21). Therefore, spindle head 50 takes a standby state at the target position for t23−t21 seconds. Table 70 takes a standby state at the target position for t23−t22 seconds.

Spindle head 50 and table 70 arrive at the target position over the shortest time by the maximum acceleration and maximum deceleration, as mentioned previously. Spindle head 50 and table 70 will have to stand by until spindle 80 arrives at the target rotational speed. Therefore, power will be consumed needlessly in association with the drive of spindle head 50 and table 70 when such control is conducted by machine tool 1. Thus, machine tool 1 preferably conducts the control shown in FIGS. 7(d) and (e).

FIG. 7(d) represents the relationship between time t and speed Vsa of spindle head 50 during the travel of spindle head 50 to the target position defined by command Cr. Specifically, FIG. 7(d) represents the relationship between time t and speed Vsa of spindle head 50 in the case where spindle head 50 arrives at the target position at a time t23 seconds after the start of the drive of spindle head 50. In other words, FIG. 7(d) represents the case where the arriving time of spindle head 50 at the target position is set equal to time t23 where spindle 80 arrives at the target rotational speed.

By machine tool 1 conducting control as shown in FIG. 7(d) with respect to spindle head 50, spindle head 50 will no longer arrive at the target position in the shortest time by the maximum acceleration and maximum deceleration. Therefore, power consumption can be reduced than that of FIG. 7(a).

FIG. 7(e) represents the relationship between time t and speed Vsb of table 70 in the case where table 70 travels to the target position defined by command Cr. More specifically, FIG. 7(e) represents the relationship between time t and speed Vsb of table 70 in the case where table 70 arrives at the target position at a time t23 seconds after the start of table 70. Namely, FIG. 7(e) represents the case where the arriving time of table 70 at the target position is set equal to time t23 where spindle 80 arrives at the target rotational speed.

By machine tool 1 conducting control as shown in FIG. 7(e) with respect to table 70, table 70 will no longer arrive at the target position in the shortest time by the maximum acceleration and maximum deceleration. Therefore, power consumption can be reduced than that of FIG. 7(b).

Machine tool 1 may control the drive of spindle head 50 such that the travel of spindle head 50 to the target position is completed during time t21 to time t23. Further, machine tool 1 may control the drive of table 70 such that the travel of table 70 to the target position is completed during time t22 to time t23.

Although the present invention has been described based on three specific examples, the present invention is not limited thereto. Furthermore, although the embodiment was described corresponding to the case where a command is executed to increase the revolution until arriving at the target rotational speed in FIGS. 5 and 7 for spindle 80, similar control can be applied to the case where a command is executed to decrease the revolution until arriving at the target rotational speed.

A specific configuration of machine tool 1 to realize control including the exemplified control of FIGS. 5-7 will be described hereinafter. More specifically, a specific configuration of machine tool 1 to realize control including the exemplified control shown in FIG. 5(d), FIG. 6(d), and FIGS. 7(d) and (e), by way of example, will be described.

<Functional Block>

Figure 8:
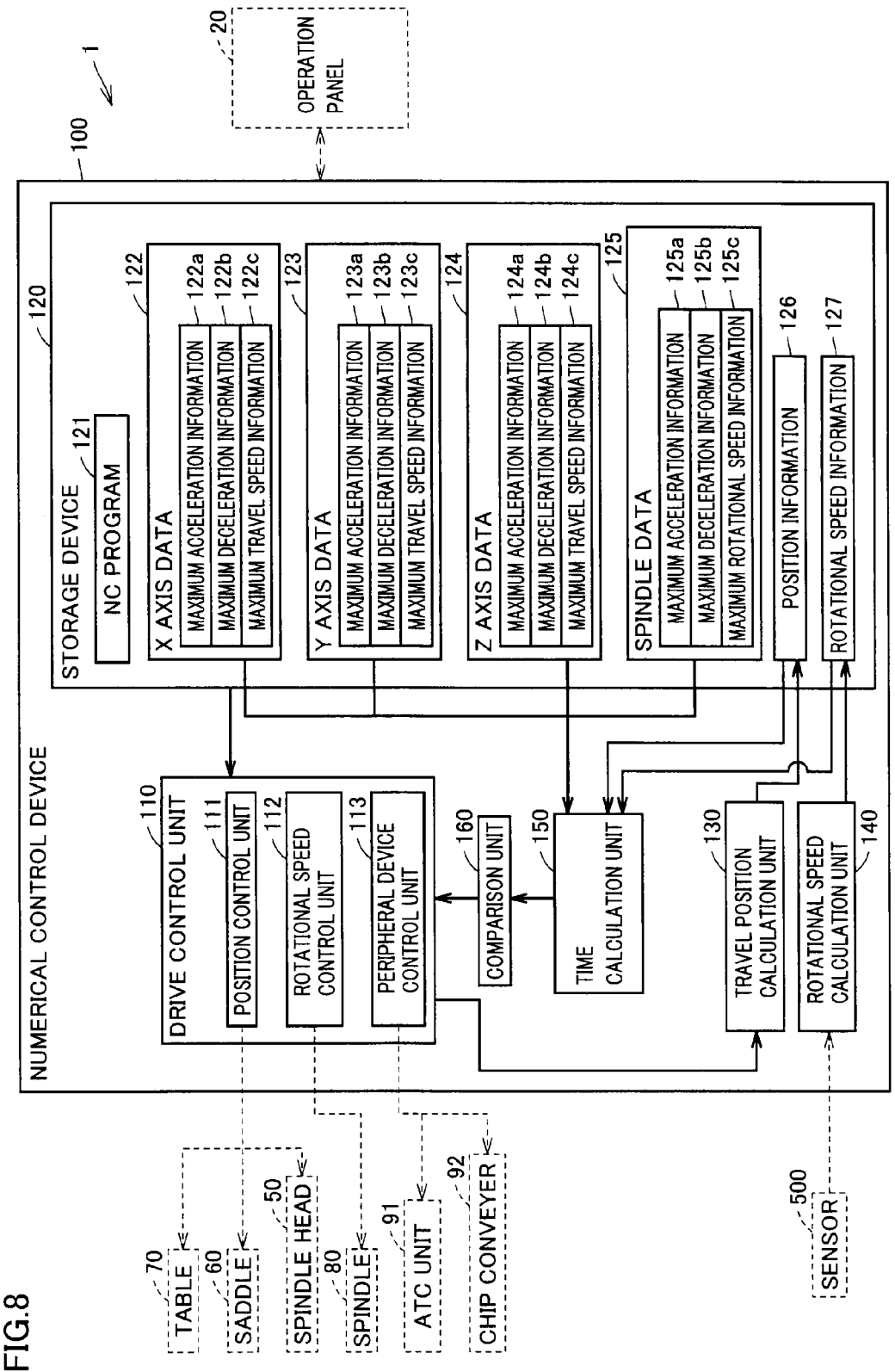
FIG. 8 is a functional block diagram of a numerical control device.

Referring to the functional block diagram of FIG. 8, numerical control device 100 includes a drive control unit 110, a storage device 120, a travel position calculation unit 130, a rotational speed calculation unit 140, a time calculation unit 150, and a comparison unit 160. Drive control unit 110 includes a position control unit 111, a rotational speed control unit 112, and a peripheral device control unit 113.

Units 110, 130, 140, 150 and 160 in numerical control device 100 are functional blocks. Each functional block is implemented by CPU 101 executing a program stored in memory 102. Each functional block may also be implemented by hardware.

Storage device 120 prestores an NC program 121, X axis data 122, Y axis data 123, Z axis data 124, and spindle data 125. Storage device 120 also stores position information 126 and rotational speed information 127. Storage device 120 corresponds to memory 102 in FIG. 3.

X axis data 122 includes maximum acceleration information 122a indicating the maximum acceleration of table 70, maximum deceleration information 122b indicating the maximum deceleration of table 70, and maximum travel speed information 122c indicating the maximum travel speed of table 70. Y axis data 123 includes maximum acceleration information 123a indicating the maximum acceleration of saddle 60, maximum deceleration information 123b indicating the maximum deceleration of saddle 60, and maximum travel speed information 123c indicating the maximum travel speed of saddle 60. Z axis data 124 includes maximum acceleration information 124a indicating the maximum acceleration of spindle head 50, maximum deceleration information 124b indicating the maximum deceleration of spindle head 50, and maximum travel speed information 124c indicating the maximum travel speed of spindle head 50. Spindle data 125 includes maximum acceleration information 125a indicating the maximum acceleration of spindle 80, maximum deceleration information 125b indicating the maximum deceleration of spindle 80, and maximum rotational speed information 125c indicating the maximum rotational speed of spindle 80.

Drive control unit 110 controls the drive of each control object (refer to FIG. 3) included in control object group 400 based on NC program 121 and various information stored in storage device 120.

Position control unit 111 controls each position of table 70, saddle 60, and spindle head 50. In other words, position control unit 111 moves table 70, saddle 60, and spindle head 50 to each target position defined by each command in the NC program. Position control is a concept including speed control up to the target position. Position control unit 111 conducts speed control by controlling the acceleration/deceleration and the time of acceleration/deceleration.

Rotational speed control unit 112 controls the rotational speed of spindle 80. Namely, rotational speed control unit 112 provides control to rotate spindle 80 at the target rotational speed defined by each command in the NC program.

Peripheral device control unit 113 controls the drive of peripheral devices with respect to main unit 5 such as ATC unit 91 and chip conveyer 92 according to NC program 121 and the like prestored in storage device 120.

Travel position calculation unit 130 calculates, at a predetermined interval, each position of table 70, saddle 60, and spindle head 50, based on execution of each command in the NC program by drive control unit 110. Travel position calculation unit 130 stores the information of each calculated position as position information 126. In other words, travel position calculation unit 130 stores the current position information of table 70, the current position information of saddle 60, and the current position information of spindle head 50 as position information 126. Drive control unit 110 refers to position information 126 in the execution of each command to drive control object group 400.

Rotational speed calculation unit 140 obtains the revolutions of spindle 80 from sensor 500. Rotational speed calculation unit 140 calculates the current rotational speed of spindle 80 from the obtained revolution count, and the data (not shown) indicating the relationship between a revolution count and a rotational speed prestored in storage device 120. Rotational speed calculation unit 140 stores the calculated rotational speed of spindle 80 as rotational speed information 127 in storage device 120.

Time calculation unit 150 carries out the operation set forth below when two components among table 70, saddle 60, spindle head 50 and spindle 80 are to be driven by one command.

Time calculation unit 150 calculates the time for a first control object to arrive at a predetermined first state, and the time for a second control object to arrive at a predetermined second state, based on the data stored in storage device 120.

For example, in the case where the first control object is spindle 80 and the second control object is spindle head 50, time calculation unit 150 calculates the time for spindle 80 to arrive at the target revolutions defined by the relevant command and the time for spindle head 50 to arrive at the target position defined by the relevant command, based on spindle data 125 and Z axis data 124, respectively. More specifically, time calculation unit 150 calculates the time for spindle 80 to arrive at the target revolutions defined by the relevant command (hereinafter, also referred to as "arriving time") based on spindle data 125 and rotational speed information 127, and the arriving time for spindle head 50 to arrive at the target position defined by the relevant command based on Z axis data 124 and position information 126. Time calculation unit 150 sends each calculated arriving time to comparison unit 160.

In the case where three or more components among table 70, saddle 60, spindle head 50 and spindle 80 are to be driven in response to one command, time calculation unit 150 calculates the arriving time according to the above-described method for each of the three or more control objects to be driven. Following the calculation, time calculation unit 150 sends each calculated arriving time to comparison unit 160.

In the case where two components among table 70, saddle 60, spindle head 50 and spindle 80 are to be driven in response to one command, comparison unit 160 compares the arriving time to arrive at the first state with the arriving time to arrive at the second state. For example, in the case where the first control object is spindle 80 and the second control object is spindle head 50, the length of the arriving time for spindle 80 to arrive at the target revolutions defined by the relevant command is compared with the arriving time for spindle head 50 to arrive at the target position defined by the relevant command. Comparison unit 160 sends the comparison result and each arriving time calculated by time calculation unit 150 to drive control unit 110.

In the case where three or more components among table 70, saddle 60, spindle head 50 and spindle 80 are to be driven in response to one command, time calculation unit 150 compares the length of each calculated arriving time for the three or more control objects to be driven. Following the calculation, comparison unit 160 sends each calculated arriving time to drive control unit 110.

In the case where two components among table 70, saddle 60, spindle head 50 and spindle 80 are to be driven in response to one command, and a determination is made that the length of the arriving time to arrive at the first state is longer than the arriving time to arrive at the second state, drive control unit 110 controls the drive of the second control object such that the arriving time for the second control object to arrive at the second state is equal to the aforementioned calculated arriving time to arrive at the first state.

For example, in the case where the first control object is spindle 80 and the second control object is spindle head 50, and a determination is made that the length of the arriving time to arrive at the target rotational speed defined by the command is longer than the arriving time to arrive at the target position defined by the command, drive control unit 110 controls the drive of spindle head 50 such that the arriving time for spindle head 50 to arrive at the target position is equal to the calculated arriving time to arrive at the target rotational speed (refer to FIG. 5(*d*)).

In other words, drive control unit 110 controls the drive of a relevant control object such that the control object arrives at the target rotational speed and target position corresponding to the later time of the calculated time to arrive at the target rotational speed and the calculated time to arrive at the target position.

The above embodiment has been described based on, but not restricted to, a configuration in which drive control unit 110 conducts control such that the arriving time to arrive at the target rotational speed and the arriving time to arrive at the target position are equal, as shown in FIG. 5(*d*). For example, the two arriving time do not necessarily have to be consistent, as shown in FIG. 5(*c*). In this case, drive control unit 110 is configured as set forth below.

In the case where two components among table 70, saddle 60, spindle head 50 and spindle 80 are to be driven in response to one command, and a determination is made that the length of the arriving time to arrive at the first state is longer than the arriving time to arrive at the second state, drive control unit 110 controls the drive of the second control object such that the arriving time for the second control object to arrive at the second state is longer than the calculated arriving time to arrive at the second state, and shorter than or equal to the calculated arriving time to arrive at the second state.

For example, in the case where the first control object is spindle 80 and the second control object is spindle head 50, and a determination is made that the length of the arriving time to arrive at the target rotational speed defined by the command is longer than the arriving time to arrive at the target position defined by the command, drive control unit 110 controls the drive of spindle head 50 such that the arriving time for spindle head 50 to arrive at the target position is longer than the calculated arriving time to arrive at the target position, and shorter than or equal to the calculated arriving time to arrive at the target rotational speed.

The above embodiment was described based on the combination of spindle 80 and spindle head 50 as the combination in driving two control objects (first control object and second control object) in response to one command. As other combinations of driving two control objects in response to one command, the combination of spindle 80 and table 70, the combination of spindle 80 and saddle 60, the combination of spindle head 50 and table 70, the combination of spindle head 50 and saddle 60, and the combination of table 70 and saddle 60 can be cited.

With regard to the case where three or more components among table 70, saddle 60, spindle head 50 and spindle 80 are to be driven in response to one command, drive control unit 110 conducts control similar to that described above for the two components (FIG. 7). Therefore, description thereof will not be repeated.

As a combination in the case of driving three control objects in response to one command, the combination of spindle 80, spindle head 50 and table 70; the combination of spindle 80, spindle head 50, and saddle 60; the combination of spindle 80, table 70, and saddle 60; and the combination of spindle head 50, table 70, and saddle 60 can be cited. Furthermore, as a combination in the case where four control objects are to be driven in response to one command, the combination includes spindle 80, spindle head 50, table 70, and saddle 60.

In the event of such a combination, drive control unit 110 controls the drive of the relevant control object such that each control object arrives at the target rotational speed and target position corresponding to the later time from the calculated time to arrive at the target rotational speed and the calculated time to arrive at each target position.

<Details of Operation>

Specific examples of control by drive control unit 110 will be described in further detail than the description in <Overview of Operation>. The following description will be based on a configuration in which the aforementioned arriving time is set to coincide with each other by altering the acceleration and deceleration of the control object. Further, description will be based on the case where spindle head 50 and spindle 80 are driven in response to one command.

Figure 9:
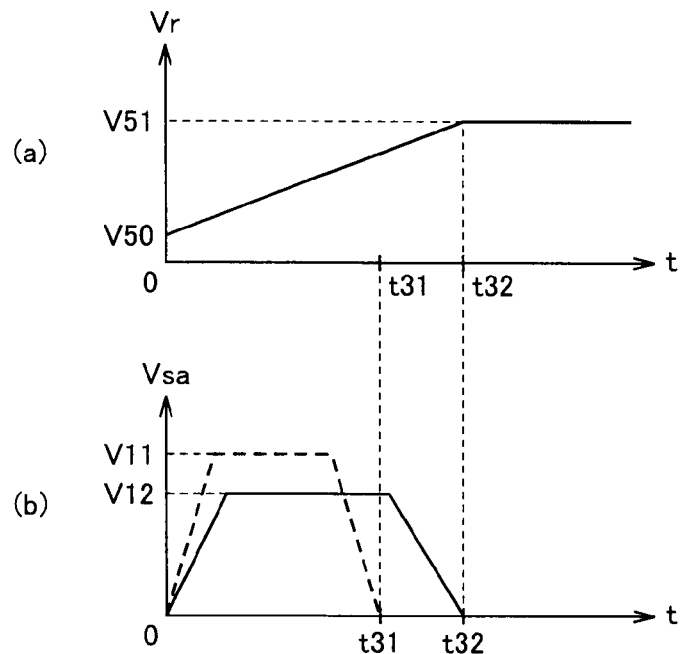
FIG. 9 is a diagram to describe an example of control executed at the machine tool.

FIG. 9 is a diagram to describe an example of control executed at machine tool 1. Specifically, FIG. 9 is a diagram to describe control executed by machine tool 1 when one command directed to driving spindle head 50 and spindle 80 is executed.

FIG. 9(*a*) represents the relationship between time t for spindle 80 to arrive at the target rotational speed defined by the relevant command and rotational speed Vr of spindle 80. Specifically, FIG. 9(*a*) shows spindle 80 gaining speed at the maximum acceleration to arrive at a target rotational speed V51, and continuously rotating at target rotational speed V51 thereafter.

Referring to FIG. 9(*a*), spindle 80 arrives at target rotational speed V51 at a time t32 seconds after the start of the drive based on the command. The rotational speed of spindle 80 immediately preceding execution of the command is V50. The state of spindle 80 at the rotational speed of V50 is stored in storage device 120 as rotational speed information 127.

FIG. 9(*b*) represents the relationship between time t and speed Vsa of spindle head 50 when spindle head 50 travels to a target position defined by the command. Referring to FIG. 9(*b*), an example of comparison is indicated by the broken line. The broken line graph shows spindle head 50 gaining speed at the maximum acceleration to arrive at maximum travel speed V11, and then in a stopped state under maximum deceleration. In this case, as a result of the calculation by time calculation unit 150, spindle head 50 will arrive at the target position at a time t31 seconds (t31<t32) after the start of the drive.

Accordingly, drive control unit 110 alters the acceleration and deceleration of spindle head 50. The graph in the solid line represents the case where drive control unit 110 alters the acceleration and deceleration of spindle head 50. Specifically, drive control unit 110 sets the acceleration of spindle head 50 lower than the maximum acceleration, and the deceleration of spindle head 50 lower than the maximum deceleration. FIG. 9(*b*) represents an example where drive control unit 110 sets the maximum speed of spindle head 50 in the drive thereof at a speed V12 lower than maximum travel speed V11.

Drive control unit 110 sets, for example, the acceleration, deceleration, acceleration time, and deceleration time to allow arrival at the target position at arriving time t32, based on maximum acceleration information 124*a*, maximum deceleration information 124*b*, and maximum travel speed information 124*c*. Specifically, drive control unit 110 performs the setting of the acceleration, deceleration, acceleration time, and deceleration time based on the NC program stored in storage device 120.

There are a plurality of combinations of the acceleration, deceleration, acceleration time, and deceleration time for modification to arrive at the target position at arriving time t32. For example, drive control unit 110 may be configured to set the acceleration and deceleration lower from the maximum acceleration and maximum deceleration by just a predetermined rate, and not change the acceleration time and deceleration time. The combination of the acceleration, deceleration, acceleration time, and deceleration time for modification is not particularly limited.

Figure 10:
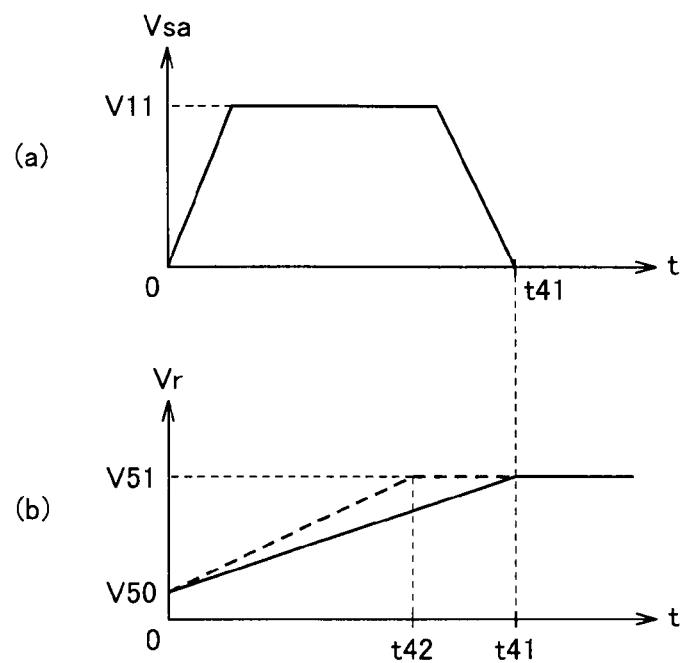
FIG. 10 is a diagram to describe another example of control executed at the machine tool.

FIG. 10 is a diagram to describe another example of control executed by machine tool 1. Specifically, FIG. 10 is a diagram to describe control executed by machine tool 1 when one command directed to driving spindle head 50 and spindle 80 is executed, likewise with FIG. 9.

FIG. 10(*a*) represents the relationship between time t and speed Vsa of spindle head 50 when spindle head 50 travels to a target position defined by the relevant command. More specifically, FIG. 10(*a*) shows spindle head 50 gaining speed at the maximum acceleration to arrive at a maximum travel speed V11, and then in a stopped state under maximum deceleration. Referring to FIG. 10(*a*), spindle head 50 arrives at the target position at a time t41 seconds after the start of the drive based on the command.

FIG. 10(*b*) represents the relationship between time t before spindle 80 arrives at a target rotational speed defined by the command and rotational speed Vr of spindle 80. Referring to FIG. 10(*b*), an example of comparison is indicated by the broken line. The broken line graph shows spindle 80 gaining speed at the maximum acceleration from the rotating state at rotational speed V50 to arrive at target travel speed V51, and then continuing rotation at target travel speed V51. In this case, as a result of the calculation by time calculation unit 150, spindle 80 will arrive at target rotational speed V51 at a time t42 seconds (t42<t41) after the start of the drive based on the command. Accordingly, drive control unit 110 alters the acceleration of spindle 80. The graph in the solid line represents the case where drive control unit 110 alters the acceleration of spindle 80. Specifically, drive control unit 110 sets the acceleration of spindle 80 lower than the maximum acceleration.

Drive control unit 110 sets the acceleration and acceleration time to allow arrival at target rotational speed V51 at arriving time t41, based on maximum acceleration information 125a and maximum rotational speed information 125c. Specifically, drive control unit 110 performs the setting of the acceleration and acceleration time based on the NC program stored in storage device 120. The combination of the acceleration and acceleration time to arrive at target rotational speed V51 at arriving time t41 is determined in one to one correspondence when the acceleration is constant.

FIGS. 9 and 10 are based on the case where machine tool 1 drives spindle head 50 and spindle 80 in response to one command. With regard to a combination of control objects other than the combination of spindle head 50 and spindle 80, control similar to that of the combination of spindle head 50 and spindle 80 is carried out. Namely, machine tool 1 controls the drive of the relevant control object such that each control object arrives at the target rotational speed and target position corresponding to the later time from the calculated time to arrive at the target rotational speed and the calculated time to arrive at each target position.

<Control Structure>

Figure 11:
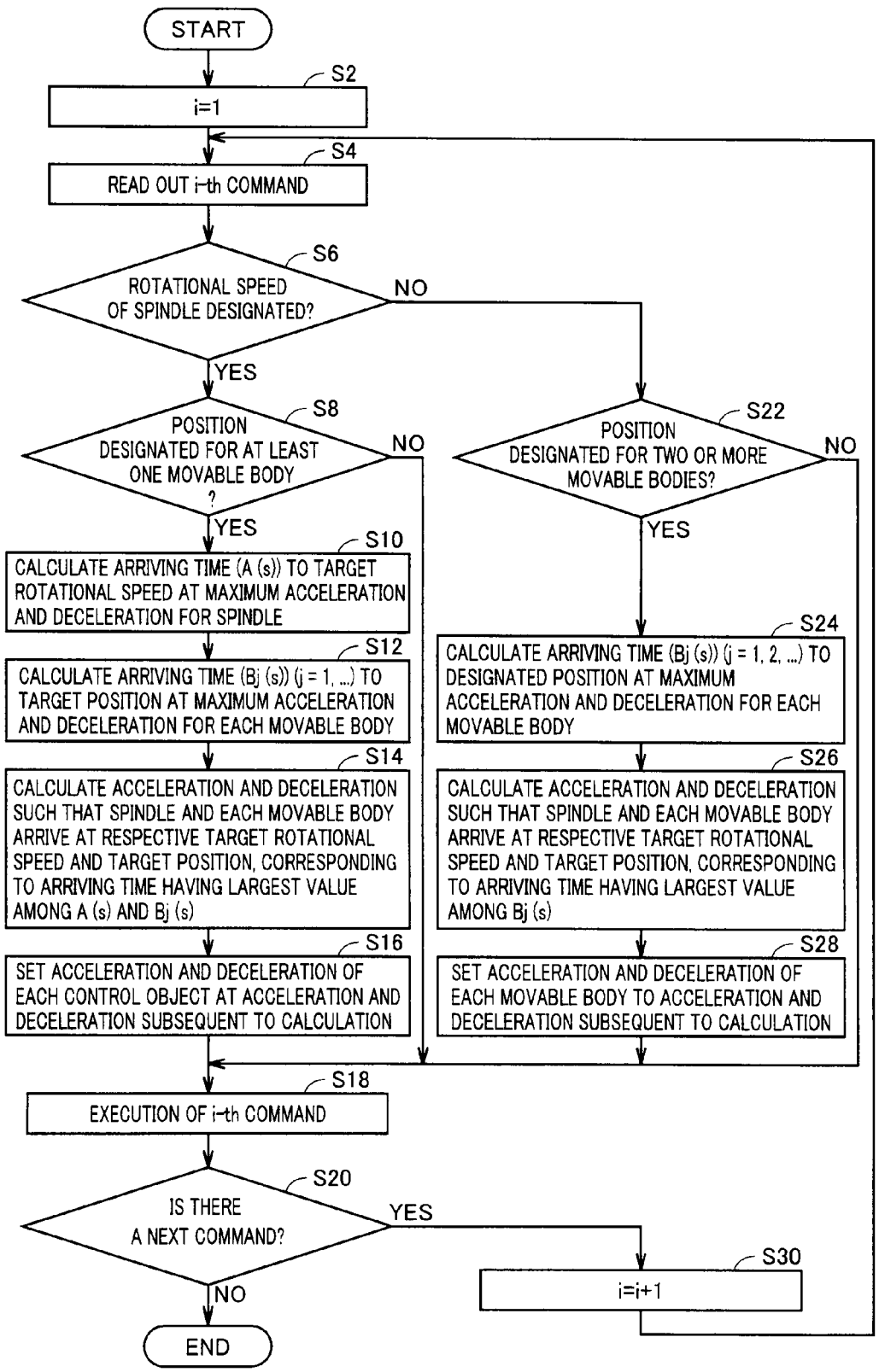
FIG. 11 is a flowchart of the processes at a machine tool.

FIG. 11 is a flowchart of the processing at machine tool 1. In the following, control objects that move in linear travel such as spindle head 50, saddle 60 and table 70 are also referred to as "movable body".

At step S2 in FIG. 11, machine tool 1 sets a variable i (not shown) prestored in storage device 120 at 1, where i is a natural number of 1 and above. At step S4, machine tool 1 reads out the i-th command from NC program 121 in storage device 120. At step S6, machine tool 1 determines whether there is a description designating the rotational speed of spindle 80 in the i-th command read out.

When machine tool 1 determines that there is a description designating the rotational speed of spindle 80 (YES at step S6), control proceeds to step S8 where a determination is made whether there is a description designating the position of at least one movable body in the i-th command read out. When machine tool 1 determines that there is a description designating the position for at least one movable body (YES at step S8), control proceeds to S10 to calculate an arriving time A (S) to the target rotational speed for spindle 80 when the speed is gained and slowed down at the maximum acceleration and maximum deceleration.

At step S12, machine tool 1 obtains an arriving time Bj(s) to the target position, where j is a natural number of 1 and above, for each movable body designated to move to the target position in i-th command when the speed is gained and slowed down at the maximum acceleration and maximum deceleration. In the case where there is only one movable body designated to move to the target position, machine tool 1 obtains arriving time B1(s). In the case where there are two movable bodies designated to move to the target position, machine tool 1 obtains two arriving times (arriving time B1(s) and B2 (s)). In the case where there are three movable bodies designated to move to the target position, machine tool 1 obtains three arriving times (arriving time B1(s), B2(s), and B3(s)).

At step S14, machine tool 1 calculates the acceleration and/or deceleration of each control object such that spindle 80 and each movable object designated to move to the target position arrive at the target rotational speed and target position corresponding to the arriving time having the largest value among A(s) and Bj(s). Machine tool 1 also calculates the acceleration time and deceleration time, as necessary. At step S16, machine tool 1 sets the acceleration and/or deceleration of the control object at the calculated acceleration and/or deceleration.

At step S18, machine tool 1 executes the i-th command. At step S20, machine tool 1 determines whether there is a next command or not. When machine tool 1 determines that there is a next command (YES at step S20), control proceeds to step S30 to increment the value of i by 1. Machine tool 1 returns to the process of step S4 following the process of step S30. When machine tool 1 determines that there is not a next command (NO at step S20), the process ends.

In the case where machine tool 1 determines that there is not a description designating the rotational speed of spindle 80 (NO at step S6), control proceeds to step S22 to determine whether there is a description designating the position for two or more movable objects in the i-th command read out. When machine tool 1 determines that there is a description designating the position for two or more movable objects (YES at step S22), control proceeds to step S24 to obtain the arriving time Bj(s) to the target position for each movable body designated to move to the target position in the i-th command when the speed is gained and slowed down at the maximum acceleration and maximum deceleration. In the case where machine tool 1 determines that there is not a description designating the position for two or more movable objects (NO at step S22), control proceeds to step S18.

At step S26, machine tool 1 calculates the acceleration and/or deceleration of each movable body such that each movable body designated to move to the target position arrives at each target position corresponding to the arriving time having the largest value among arriving time Bj(s). Further, machine tool 1 also calculates the acceleration time and deceleration time as necessary. At step S28, machine tool 1 sets the acceleration and/or deceleration of each movable body at the calculated acceleration and/or deceleration.

Machine tool 1 can drive a control object in a power-saving mode by the process shown in FIG. 11.

<Modification>

(1) A configuration in which the arriving time to the target position and arriving time to the target rotational speed are made to coincide with each other by drive control unit 110 altering the acceleration time and deceleration time of spindle head 50 in the case where spindle head 50 and spindle 80 are to be driven in response to one command will be described hereinafter. In other words, drive control unit 110 is based on a configuration in which only the acceleration time and deceleration time are to be altered, instead of altering the acceleration, deceleration, acceleration time and deceleration time, as shown in FIG. 9.

Figure 12:
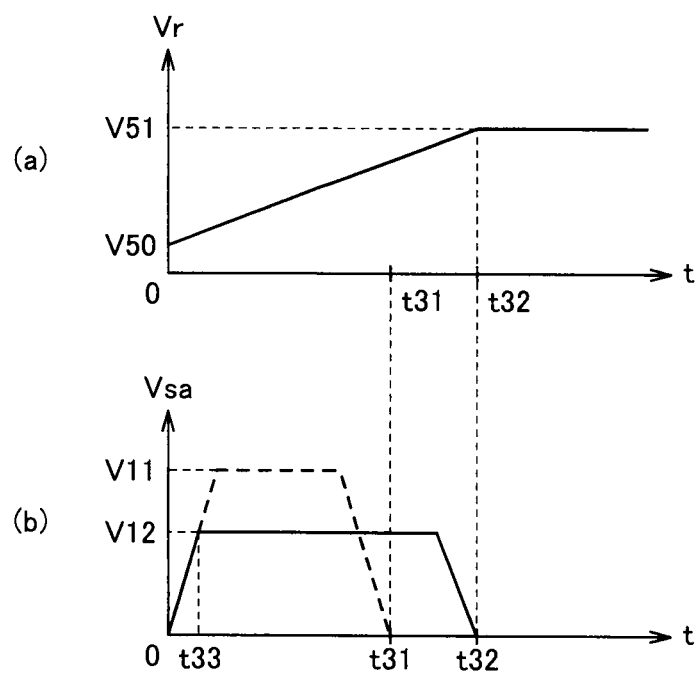
FIG. 12 is a diagram to describe control executed by the machine tool when one command directed to driving a spindle head and a spindle is executed.

FIG. 12 is a diagram to describe control executed by machine tool 1 when one command directed to driving spindle head 50 and spindle 80 is executed. More specifically, FIG. 12 is a diagram to describe a configuration in which the acceleration time and deceleration time of spindle head 50 are modified without changing the acceleration and deceleration of spindle head 50.

FIG. 12(a) represents the relationship of time t for spindle 80 to arrive at the target rotational speed defined by the command and rotational speed Vr of spindle 80. Specifically, FIG. 12(a) shows spindle 80 gaining speed at the maximum acceleration to arrive at target rotational speed V51, and then continuing rotation at target rotational speed V51. Referring to FIG. 12(a), spindle 80 arrives at target rotational speed V51 at a time t32 seconds after the start of the drive based on the command. The rotational speed of spindle 80 immediately preceding execution of the command is V50.

FIG. 12(b) represents the relationship between time t and speed Vsa of spindle head 50 when spindle head 50 is moved to the target position defined by the command. Referring to FIG. 12(b), the comparison example of the graph in the broken line represents spindle head 50 gaining speed at the maximum acceleration to arrive at maximum travel speed V11, and then in a stopped state under maximum deceleration. In this case, as a result of the calculation by time calculation unit 150, spindle head 50 will arrive at the target position at a time t31 seconds after the start of the drive (t31<t32).

Accordingly, drive control unit 110 modifies the acceleration time and deceleration time of spindle head 50. The graph in the solid line represents the case where drive control unit 110 alters the acceleration time and deceleration time of spindle head 50. Specifically, drive control unit 110 sets the acceleration time and deceleration time of spindle head 50 at a value lower than the acceleration time and deceleration time indicated by the broken line.

Drive control unit 110 sets the acceleration time and deceleration time to allow arrival at the target position at arriving time t32 based on maximum acceleration information 124*a*, maximum deceleration information 124*b*, and maximum travel speed information 124*c*. Specifically, drive control unit 110 sets the acceleration time and deceleration time based on the NC program stored in storage device 120. More specifically, drive control unit 110 obtains, by calculation, the acceleration time and deceleration time required to advance a predetermined distance at a constant acceleration and constant deceleration in a time t32 of seconds.

Although the above description is based on an example of a combination of spindle 80 and spindle head 50, the same applies to a combination of spindle 80 and another movable body (saddle 60, table 70).

(2) The above description is based on a configuration in which the unique control by drive control unit 110 is applied to a rotating body rotatably driven (spindle 80) and a movable body (linearly-traveling control object (spindle head 50, saddle 60, table 70)), or to a movable body and another movable body (refer to FIG. 60). In the following, the unique control by drive control unit 110 will be described based on a configuration applying the unique control between rotatably-driven rotating bodies.

For control between rotating bodies, spindle 80 and an ATC arm (not shown) in ATC unit 91, for example, can be cited. An ATC arm functions to grasp a tool, and rotates about a rotation axis.

Figure 13:
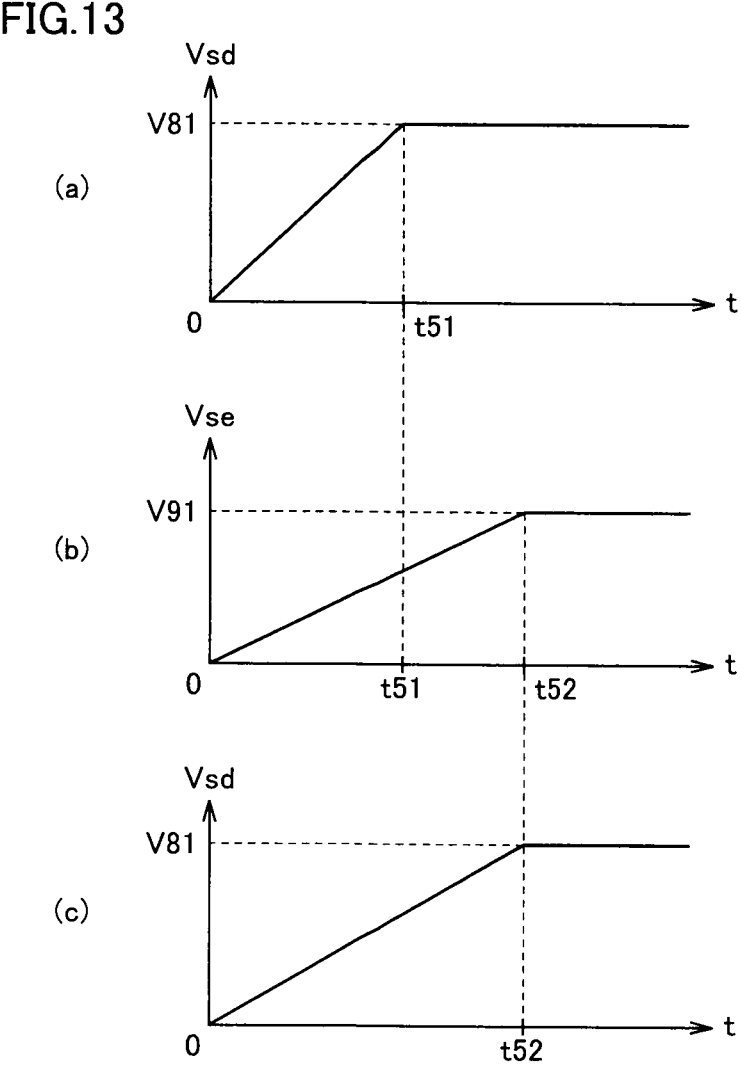
FIG. 13 is a diagram to describe control executed by the machine tool when one command directed to driving a first rotating body and a second rotating body is executed.

FIG. 13 is a diagram to describe control executed by machine tool 1 when one command directed to driving a first rotating body and a second rotating body is executed.

FIG. 13(*a*) corresponds to a comparison example, showing the relationship between time t for the first rotating body to arrive at a target rotational speed V81 defined by the relevant command and a rotational speed Vsd of the first rotating body. More specifically, FIG. 13(*a*) shows the first rotating body gaining speed at the maximum acceleration to arrive at target rotational speed V81, and then continuing rotation at target rotational speed V81 thereafter. Referring to FIG. 13(*a*), the first rotating body arrives at target rotational speed V81 at a time t51 seconds after the start of the drive based on the command.

FIG. 13(*b*) represents the relationship between time t for the second rotating body to arrive at a target rotational speed V91 defined by the relevant command and a rotational speed Vse of the second rotating body. More specifically, FIG. 13(*b*) shows the second rotating body gaining speed at the maximum acceleration to arrive at target rotational speed V91, and then continuing rotation at target rotational speed V91 thereafter. Referring to FIG. 13(*b*), the second rotating body arrives at target rotational speed V91 at a time t52 seconds after the start of the drive based on the command (t52>t51).

FIG. 13(*c*) represents the relationship between time t for the first rotating body to arrive at target rotational speed V81 and rotational speed Vsd of the first rotating body when drive control unit 110 carries out the above-described unique control. Referring to FIG. 13(*c*), machine tool 1 causes rotational speed Vsd of the first rotating body to arrive at target rotational speed V81 at a time t52 seconds after the start of the drive of the first rotating body.

Machine tool 1 conducts the control as shown in FIG. 13(*c*) for the first rotating body to avoid arriving at target rotational speed V81 in the shortest time by the maximum acceleration. Therefore, machine tool 1 can further reduce power consumption as compared to that of FIG. 13(*a*).

(3) The unique control is also applicable to a device that machines a work by rotating a work and tool (for example, a device performing machining by a spinning tool). Further, the unique control is also applicable to a lathe. For example, the unique control is applicable between a turret that moves linearly, and a chuck that secures a work and rotates together with the work.

(4) Machine tool 1 calculates each position of each movable body (table 70, saddle 60, and spindle head 50) based on the execution of each command in the NC program at a constant time interval. Calculation of each position may be obtained by calculation based on the coordinate values included in each command in the NC program. Alternatively, each position may be calculated using a linear scale. The method of obtaining the current position of each movable body is not particularly limited.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool including a first control object and a second control object drives said first control object and said second control object, said machine tool comprising:

a storage device storing first information including at least one of maximum acceleration and maximum deceleration and maximum speed when said first control object is driven, and second information including at least one of maximum acceleration and maximum deceleration and maximum speed when said second control object is driven, a calculation unit configured to calculate a first shortest time for said first control object to arrive at a predetermined first state, and a second shortest time for said second control object to arrive at a predetermined second state, based on said first information and said second information, a comparison unit configured to compare said first shortest time with said second shortest time, and a drive control unit configured to control a drive of said first control object and a drive of said second control object, said drive control unit controlling, when a determination is made that said first shortest time is longer than said second shortest time, the drive of said first control object such that a time for said first control object to arrive at said first state is equal to said first shortest time, and the drive of said second control object such that a time for said second control object to arrive at said second state is longer than said second shortest time, and less than or equal to said first shortest time.

2. The machine tool according to claim 1, wherein
said first control object moves in only one of rotation and linear travel, as said drive,
said second control object moves in only one of rotation and linear travel, as said drive,
said drive control unit controls the drive of said second control object, when the determination is made that said first shortest time is longer than said second shortest time, such that the time for said second control object is equal to said first shortest time.

3. The machine tool according to claim 2, wherein
said first control object moves in said rotation as said drive,
said second control object moves in said linear travel as said drive,
said storage device further stores rotational speed information associated with said rotation of said first control object, and travel position information associated with said linear travel of said second control object, and
said calculation unit calculates said first shortest time and said second shortest time, based on said rotational speed information and said travel position information.

\* \* \* \* \*